United States Patent
Niu et al.

(10) Patent No.: US 12,289,735 B2
(45) Date of Patent: Apr. 29, 2025

(54) APPLICATION TIMELINE WITH UNIFIED DESIGN FOR ACTIVE MODE USER EQUIPMENT POWER SAVING FOR APPARATUSES, SYSTEMS, AND METHODS

(71) Applicant: APPLE INC., Cupertino, CA (US)

(72) Inventors: Huaning Niu, Cupertino, CA (US); Dawei Zhang, Cupertino, CA (US); Farhan Aziz, San Diego, CA (US); Haitong Sun, Cupertino, CA (US); Hong He, Cupertino, CA (US); Navid Ehsan, San Diego, CA (US); Sigen Ye, San Diego, CA (US); Wei Zeng, Cupertino, CA (US); Wei Zhang, Cupertino, CA (US); Weidong Yang, San Diego, CA (US)

(73) Assignee: APPLE INC., Cupertino, CA (US)

( * ) Notice: Subject to any disclaimer, the term of this patent is extended or adjusted under 35 U.S.C. 154(b) by 504 days.

(21) Appl. No.: 17/655,252

(22) Filed: Mar. 17, 2022

(65) Prior Publication Data
US 2022/0346123 A1    Oct. 27, 2022

Related U.S. Application Data

(60) Provisional application No. 63/179,070, filed on Apr. 23, 2021.

(51) Int. Cl.
*H04W 72/23*    (2023.01)
*H04L 5/00*    (2006.01)
*H04W 76/28*    (2018.01)

(52) U.S. Cl.
CPC .......... *H04W 72/23* (2023.01); *H04L 5/0055* (2013.01); *H04W 76/28* (2018.02)

(58) Field of Classification Search
CPC . H04W 72/23; H04W 24/08; H04W 72/0446; H04W 76/28; H04W 52/0216;
(Continued)

(56) References Cited

U.S. PATENT DOCUMENTS

2020/0314948 A1    10/2020    Babaei et al.
2022/0201516 A1*    6/2022    Guo .................. H04W 72/0453
(Continued)

FOREIGN PATENT DOCUMENTS

WO    2021067921 A1    4/2021

OTHER PUBLICATIONS

Mediatek Inc., "On enhancements to DCI-based UE power saving during DRX active time Document for: Discussion and Decision", R1-2100593, 3GPP TSG RAN WG1 #104-e, e-Meeting, Agenda Item 8.7.2, Jan. 25-Feb. 5, 2021, 7 pages.
(Continued)

*Primary Examiner* — Marisol Figueroa
(74) *Attorney, Agent, or Firm* — Dorsey & Whitney LLP

(57) ABSTRACT

A wireless communication system may adapt physical downlink control channel (PDCCH) monitoring behaviors using downlink control information (DCI). The change in monitoring behavior may be skipping or switching. The timeline for applying switching or skipping may be applied after a reference point and a processing time. In some embodiments, the processing time may be either based on UE processing, network processing, or a combination.

12 Claims, 13 Drawing Sheets

(58) Field of Classification Search
CPC ............ H04W 52/0235; H04W 72/232; H04L 5/0053; H04L 1/1854; H04L 1/188; H04L 5/0055; Y02D 30/70
See application file for complete search history.

(56) References Cited

U.S. PATENT DOCUMENTS

| | | | |
|---|---|---|---|
| 2022/0225299 A1* | 7/2022 | Pezeshki | H04L 5/0053 |
| 2022/0303960 A1* | 9/2022 | Zhou | H04L 5/0053 |
| 2023/0345370 A1* | 10/2023 | Ma | H04L 5/0053 |

OTHER PUBLICATIONS

Moderator (Vivo), "FL summary#1 of power saving for Active Time", R1-2101893, 3GPP TSG RAN WG1 Meeting #104-e, e-Meeting, Agenda Item 8.7.2, Jan. 25-Feb. 5, 2021, 52 pages.

Moderator (Vivo), "FL summary#2 of power saving for Active Time", R1-2101894, 3GPP TSG RAN WG1 Meeting #104-e, e-Meeting, Agenda Item 8.7.2, Jan. 25-Feb. 5, 2021, 55 pages.

Ericsson, "Design of Active Time Power Savings Mechanisms", Tdoc R1-2101558, 3GPP TSG RAN WG1 #104-e, e-Meeting, Agenda Item 8.7.2, Jan. 25-Feb. 5, 2021, 8 pages.

* cited by examiner

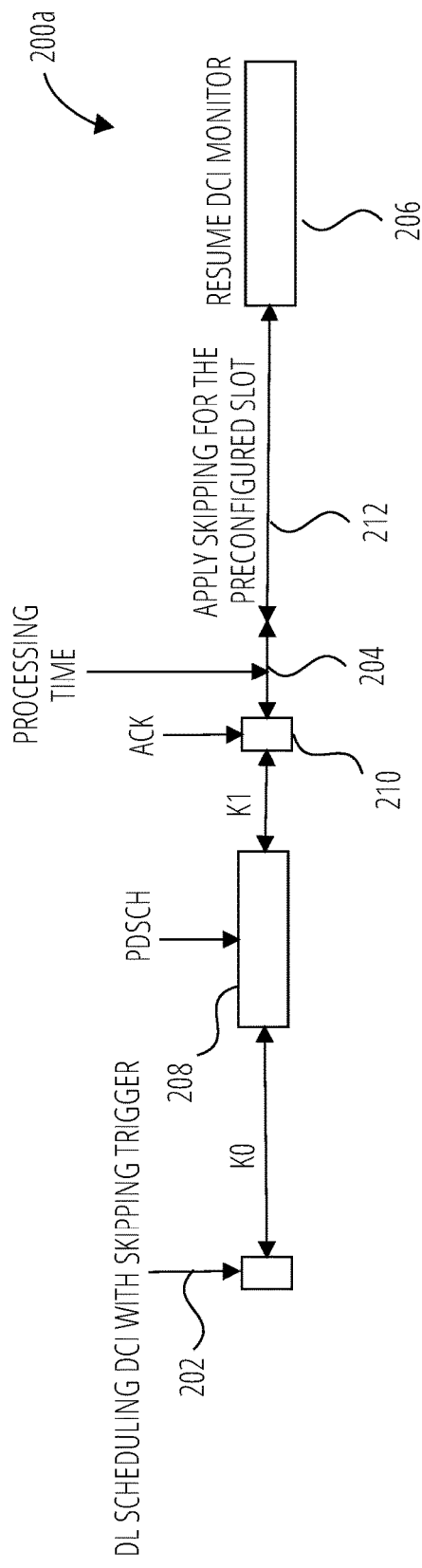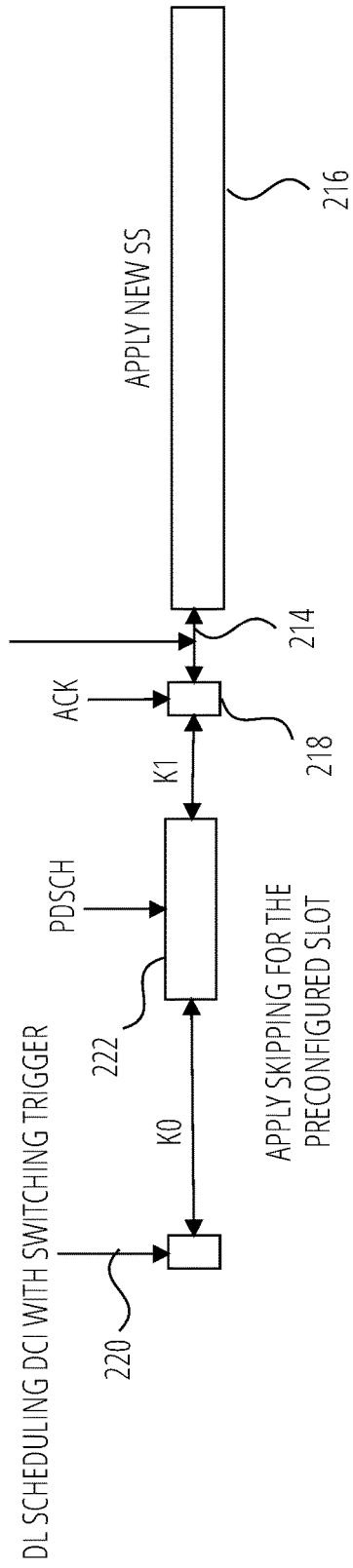

APPLICATION TIMELINE WITH UNIFIED DESIGN FOR ACTIVE MODE USER EQUIPMENT POWER SAVING FOR APPARATUSES, SYSTEMS, AND METHODS

TECHNICAL FIELD

This application relates generally to wireless communication systems, including scheduling PDCCH skipping and search space set group switching.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) may include frequency bands operating in sub-6 GHz frequencies, some of which are bands that may be used by previous standards, and may potentially be extended to cover new spectrum offerings from 410 MHz to 7125 MHz. Frequency Range 2 (FR2) may include frequency bands from 24.25 GHz to 52.6 GHz. Bands in the millimeter wave (mmWave) range of FR2 may have smaller coverage but potentially higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 2A illustrates a downlink timeline of a UE applying PDCCH monitoring skipping after transmitting an ACK message and a processing time in accordance with one embodiment.

FIG. 2B illustrates a downlink timeline of a UE applying SSSG switching after transmitting an ACK message and a processing time in accordance with one embodiment.

DETAILED DESCRIPTION

Figure 1:
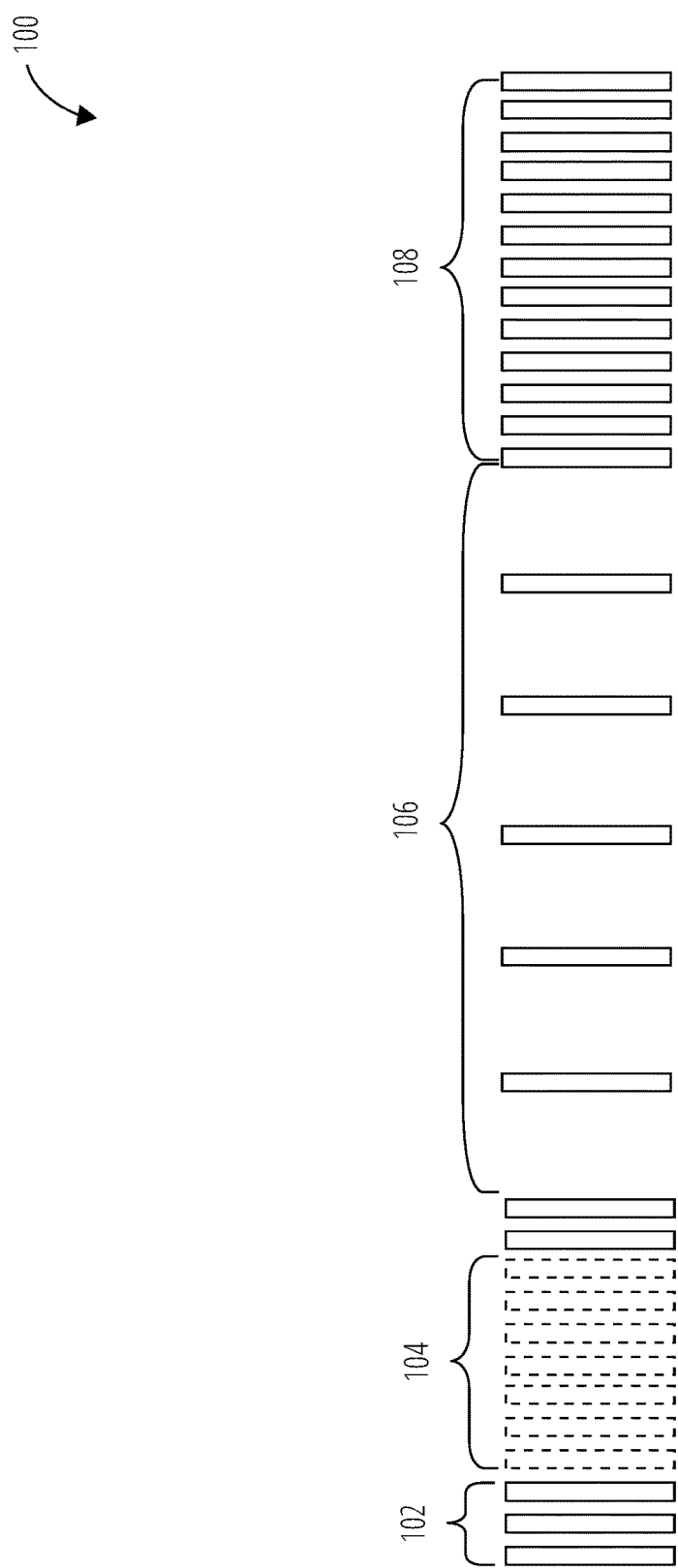
FIG. 1 illustrates UE monitoring behavior during an example timeline in accordance with one embodiment.

One goal in network communications is to reduce power consumption of a user equipment (UE). The power savings techniques used often are balanced to minimize system performance impacts. One method that may be employed to enhance power saving for a UE is to reduce or alter monitoring periods for the UE.

Embodiments herein describe systems, apparatuses, and methods for adapting physical downlink control channel (PDCCH) monitoring behaviors to reduce power consumption of a UE. In some embodiments, a network node and a UE use search space set group switching to change PDCCH monitoring behavior. In some embodiments, a network node and a UE use PDCCH skipping to change PDCCH monitoring behavior (e.g., Search Space Set Group (SSSG) switching). For example, the network node may indicate to the UE to monitor PDCCH or to skip monitoring PDCCH. Further, the network node may indicate to the UE to toggle the PDCCH monitoring pattern or make an SSSG switch.

Embodiments may include a common design for Downlink Control Information (DCI) based PDCCH monitoring adaptation in active time for an active Bandwidth Part (BWP) to support functionalities inclusive of both SSSG switching and PDCCH skipping for a duration. In some embodiments, a reference point and a delay time is determined for SSSG switching and PDCCH skipping. The reference point refers to the time or slot where a UE and network node may base the timing of a change in monitoring behavior. The delay time may refer to processing time for the UE or network node to enable the SSSG switching or PDCCH skipping. In some embodiments, the switching or skipping may be applied when an amount of time equivalent to the delay time (e.g., processing time) has elapsed after the reference point. In other words, the change in monitoring behavior is applied by the UE and the network node after the reference point plus the processing time.

Processing time may include time for the UE to process switching or skipping and time for the network node to enable switching or skipping. There are several different times related to processing time. For the UE to enable search space switching, processing related time may include time for decoding DCI and time for processing and configuration of a separate search space configuration. To simplify references to this switching processing time, T_switching is used herein to refer to the time for decoding DCI and time for processing and configuration of a separate search space configuration. Further, T_switching_1 is used herein to refer to time for processing and configuration of a separate search space configuration without DCI decoding time. In some embodiments, T_switching may be hard coded in the network node and the UE. For example, T_switching may be three slots or less.

For the UE to enable a skipping command, processing time may include time for decoding the DCI and time for applying the skipping command. To simplify references to this skipping processing time, T_skipping is used herein to refer to the time for decoding the DCI and time for applying the skipping command. Further, T_skipping_1 is used herein to refer to time for applying the skipping command without DCI decoding time. Due to no processing and configuration of a new search space, T_skipping may be smaller than T_switching. T_skipping may be hard coded in the network node and the UE. For example, T_skipping may be two slots or less.

For the network node processing related time may surround time to receive and process an Acknowledgement (ACK) from the UE or a Physical Uplink Shared Channel (PUSCH). ACK receiving and processing time may depend on whether Discontinuous Reception Mode (DRX) is configured. In some embodiments, when DRX is configured, drx-HARQ-RTT-TimerDL value may be used to represent the ACK receiving and processing time. Drx-HARQ-RTT-TimerDL is a timer that may represent the minimum duration before a DL assignment for HARQ retransmission is expected by the MAC entity. When DRX is not configured, T_ack time may be assumed to represent the ACK receiving and processing time. T_ack may be a hard coded amount of time (e.g., a number of slots). For example, T_ack may be configured to be three slots or less in some embodiments.

Network node processing time related to PUSCH receiving and processing may also depend on whether DRX is configured. When DRX is configured drx-HARQ-RTT-TimerUL value may be used to represent the PUSCH receiving and processing time. Drx-HARQ-RTT-TimerUL is a timer that may represent he minimum duration before a UL HARQ retransmission grant is expected by the MAC entity. When DRX is not configured, T_pusch time may be assumed to represent the PUSCH receiving and processing time. T_pusch may be a hard coded amount of time (e.g., a number of slots). For example, T_pusch may be configured to be three slots or less in some embodiments.

Various operations will be described as multiple discrete operations, in turn, in a manner that is most helpful in understanding the disclosure. The order of the description, however, should not be construed to imply that these operations are necessarily order dependent. In particular, these operations need not be performed in the order of presentation.

Additional details and examples are provided with reference to the figures below. The embodiments of the disclosure can be understood by reference to the drawings, wherein like parts are designated by like numerals throughout. The components of the disclosed embodiments, as generally described and illustrated in the figures herein, could be arranged and designed in a wide variety of different configurations. Thus, the following detailed description of the embodiments of the systems and methods of the disclosure is not intended to limit the scope of the disclosure, as claimed, but is merely representative of possible embodiments.

FIG. 1 illustrates UE monitoring behavior during an example timeline 100. In some embodiments, a DCI may be transmitted from a network node to a UE to indicate a change in monitoring behavior. A DCI indicating skipping may cause to the UE to not monitor certain periods of the timeline 100. A DCI indicating switching may cause the UE to use a less dense monitoring pattern. By not monitoring the entire time, a UE may reduce power consumption.

In the illustrated embodiment, during a first time period 102 there is downlink or uplink traffic. During this period, the UE may receive a DCI. The DCI may indicate to the UE to implement skipping, switching, or both skipping and switching in the monitoring behavior of the UE. The network node (e.g., gNB) may send notice via the DCI to the UE to implement skipping and/or switching for a certain number of slots and then return back to monitoring. For example, during the second time period 104 there is no traffic in downlink or uplink communication channels so the UE may skip monitoring those slots. The UE performs skipping and stops monitoring until the third time period 106. During the fourth time period 108 the UE may revert back to a more dense monitoring pattern.

A skipping value may indicate how long the skipping periods should be and when the skipping should be performed. A switching value may indicate when to apply switching and for how long. The skipping value and the switching value can be Radio Resource Control (RRC) configured. In some embodiments, a scheduling DCI may provide a timeline to apply the skipping and switching after receiving a DCI indicating skipping. For example, in some embodiments, the network node may send the DCI with skipping or switching indication together with a last transmission block for downlink/uplink transmission. The skipping or switching indication may comprise one or two bits added to the scheduling DCI. Additionally, a non-scheduling DCI or timer may be used to implement skipping or switching DCI during periods when there is no traffic to schedule.

Further, the UE and network node may be configured to synchronously implement the skipping or switching. To synchronize the monitoring pattern change between the UE and the network node, a reference point and a processing time may be determined. The change in monitoring behavior may be applied when an amount of time equivalent to the processing time has elapsed after the reference point. Below are embodiments that include various reference points and processing times to synchronize the behavior of the UE and the network node.

Figure 2C:
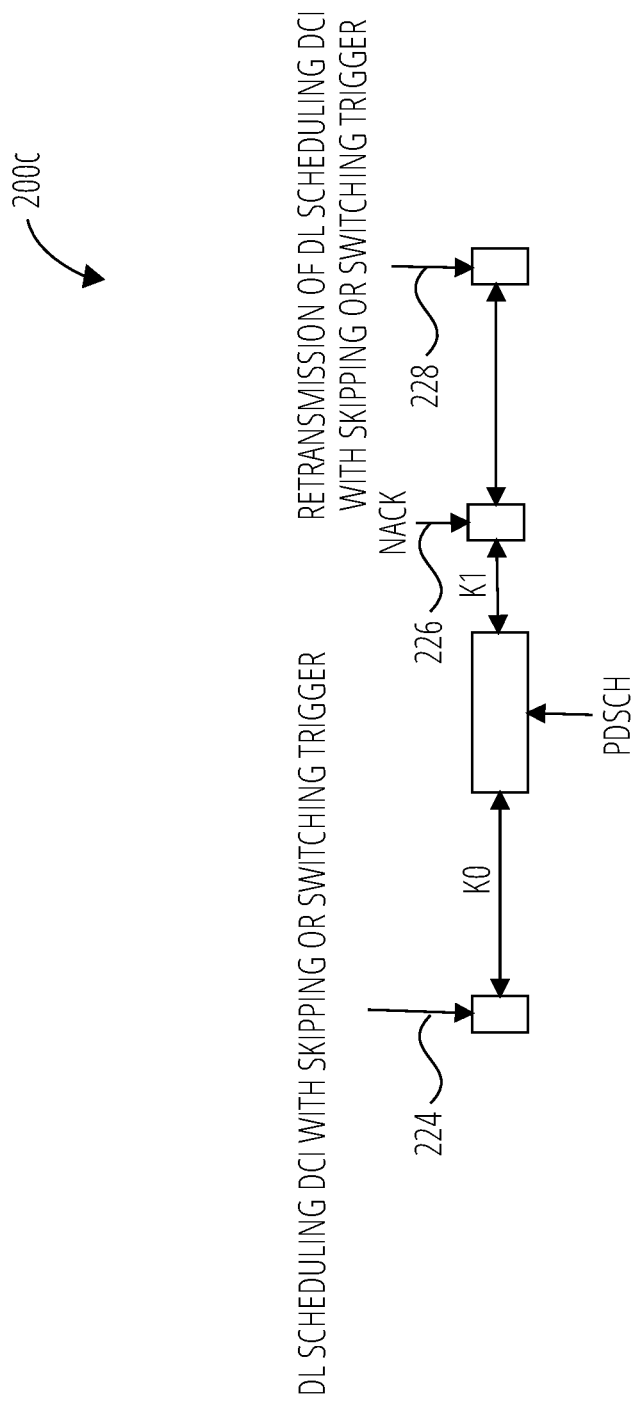
FIG. 2C illustrates a downlink timeline of a UE that receives a DL scheduling DCI with skipping or switching indication in accordance with one embodiment.

FIGS. 2A-2C illustrate downlink timelines of a UE applying PDCCH monitoring skipping or switching based on acknowledgment (ACK) messages and negative-acknowledgment (NACK) messages according to some embodiments. As shown, in some embodiments, when the DCI is signaled by a DL scheduling grant and if the UE feedback is a NACK message the triggering command is canceled since a network node cannot differentiate NACK versus Discontinuous Reception (DTX). The network node may send the triggering command (i.e., command for skipping or switching) in the DCI for retransmission grant. Further, in some embodiments, when the DCI is signaled by a DL scheduling grant and if the UE feedback is an ACK message, the UE applies skipping or switching after ACK transmission plus processing time. The DCI may be a DCI Format 1-1 and 1-2.

FIG. 2A illustrates a downlink timeline 200a of a UE applying PDCCH monitoring skipping after transmitting an ACK message 210 and a processing time 204. In this embodiment, the ACK message 210 serves as a reference point. The UE applies skipping 212 for a preconfigured slot after the UE transmits an ACK message 210 and after a processing time 204 occurs if the received downlink scheduling DCI 202 includes a skipping indication.

As shown, the network node transmits the scheduling DCI 202 during a first time period. The UE receives the scheduling DCI 202. In the illustrated embodiment, the UE proceeds with receiving the physical downlink shared channel (PDSCH) 208 from the network node and transmitting the ACK message 210 to the network node. The ACK message 210 indicates that the UE received the downlink scheduling DCI 202 correctly. There may be no retransmission expected.

After the ACK message 210 is transmitted, the UE may apply skipping 212 after a processing time 204 has expired. The UE does not perform PDCCH monitoring for a period of time after the ACK message 210 is transmitted and a processing time 204 has occurred. The amount of time that the UE spends skipping monitoring the PDCCH may be a preconfigured number of slots or an amount of time. During this time the UE is not monitoring PDCCH and therefore conserving power. The UE may resume monitoring 206 after the preconfigured skipping slot or period of time.

FIG. 2B illustrates a downlink timeline 200b of a UE applying SSSG switching 216 after transmitting an ACK message 218 and a processing time 214. In this embodiment, the ACK message 218 serves as a reference point. The UE applies switching 216 for after the UE transmits the ACK message 218 and after a processing time 214 occurs if the received downlink scheduling DCI 202 includes a skipping indication.

As shown, the network node transmits the scheduling DCI 220 during a first time period. The UE receives the scheduling DCI 220. In the illustrated embodiment, the UE proceeds with receiving the PDSCH 222 from the network node and transmitting the ACK message 218 to the network node. The ACK message 218 indicates that the UE received the downlink scheduling DCI 220 correctly. There may be no retransmission expected.

After the ACK message 218 is transmitted, the UE may apply search space switching 216 after a processing time 214 has expired. In other words, the UE applies the new search space after the ACK message 218 is transmitted and a processing time 214 has occurred.

FIG. 2C illustrates a downlink timeline 200c of a UE that receives a DL scheduling DCI 224 with skipping or switching indication. In this timeline 200c, the UE receives a DL scheduling DCI 224 with skipping or switching indication. However, the UE fails to correctly perform and sends a NACK message 226. A network node may be unable to differentiate whether the feedback is NACK (e.g., UE correctly decoded DCI, but failed PDSCH only), or Discontinuous transmission (DTX) (e.g., UE did not decode DCI). Because of this the network node may be unable to know if the DCI was correctly decoded when the feedback is a NACK message 226, the triggering command (e.g., switching or skipping command) is canceled. The network node may send a retransmitted DCI 228. If the UE is able to correctly receive and handle the retransmitted DCI 228, the UE will send an ACK message, and the UE and network node may handle the monitoring behavior change as discussed in FIGS. 2A and 2B for a skipping or switching command.

The processing time (i.e., processing time 204 and processing time 214) may be determined in a variety of ways. The processing time may be based on UE processing related time or network node related processing time.

In a first embodiment, the processing time may depend on whether the DCI includes a skipping trigger or a switching trigger. For example, in FIG. 2A, the processing time 204 may be T_skipping (i.e., the time for decoding the DCI plus the time for applying the skipping command) or T_skipping_1 (i.e., the time for applying the skipping command) because a PDCCH skipping command is triggered. Whereas, in FIG. 2B the processing time 214 may be T_switching (i.e., time for decoding DCI plus time for processing and configuration of a separate search space configuration) or T_switching_1 (i.e., time for processing and configuration of a separate search space configuration) because a new search space command is triggered.

In a second embodiment, the processing time may be configured to always be T_switching or T_switching_1 regardless of which operation is triggered. For example, the processing time 204 of FIG. 2A and the processing time 214 of FIG. 2B may both be set to T_switching. As another example, the processing time 204 of FIG. 2A and the processing time 214 of FIG. 2B may both be set to T_switching_1.

In a third embodiment, the processing time may be set to T_ack time. T_ack time may represent the ACK receiving and processing time of the network node. For example, T_ack may be configured to be three slots or less in some embodiments. Thus, the processing time 204 of FIG. 2A and the processing time 214 of FIG. 2B may both be set to T_ack.

In a fourth embodiment, the processing time may be set to the drx-HARQ-RTT-TimerDL if the timer is configured. Drx-HARQ-RTT-TimerDL is a timer that may represent the minimum duration before a DL assignment for HARQ retransmission is expected by the MAC entity.

In a fifth embodiment, the processing time may be determined based on one or more factors. For example, the processing time may be the maximum of two or more of T_switching, T_switching_1, T_skipping, T_skipping_1, T_ack, and drx-HARQ-RTT-TimerDL.

Figure 3:
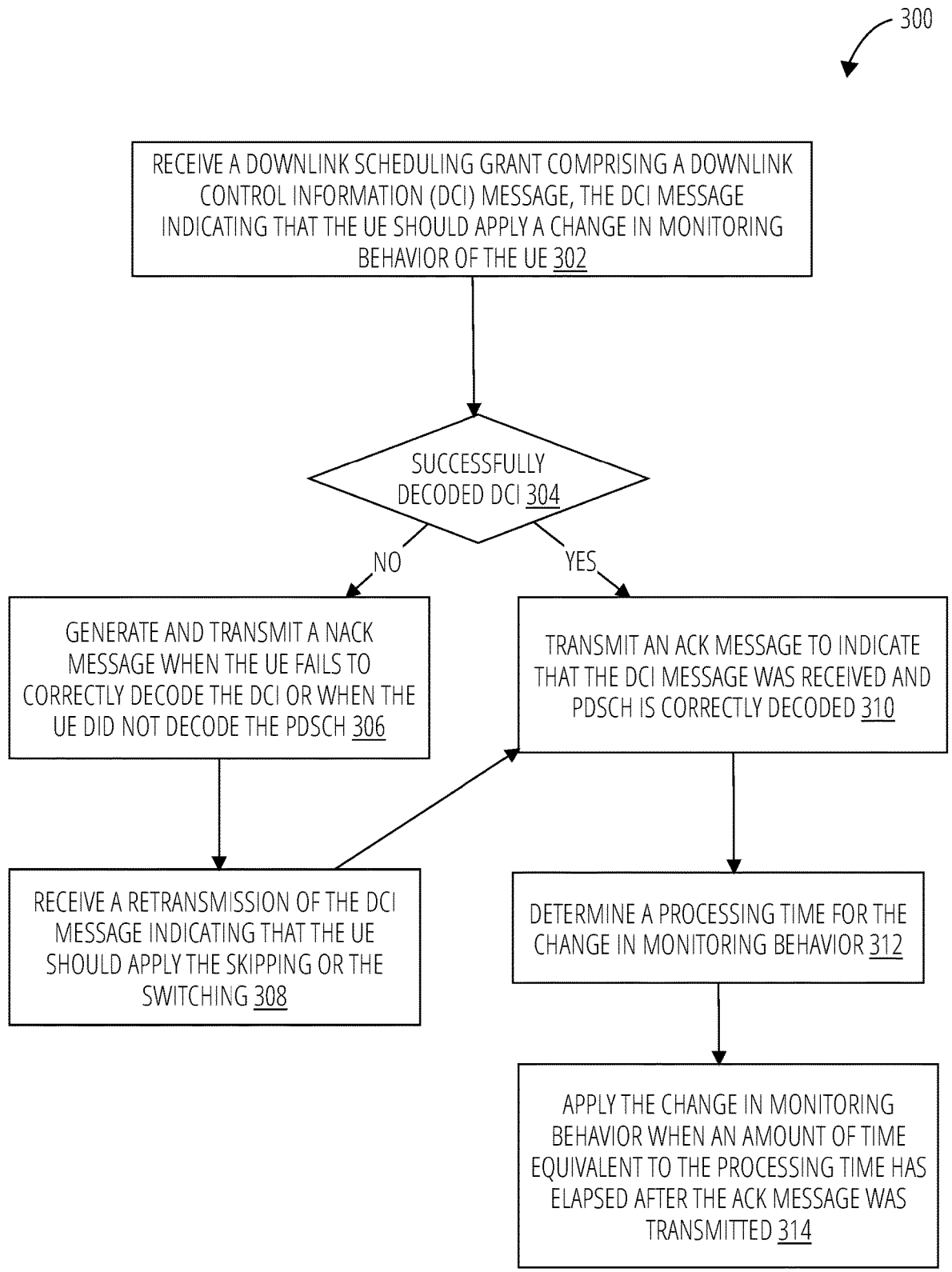
FIG. 3 illustrates a flowchart of a method for a UE to apply a power saving enhancement, including skipping and switching, using a downlink scheduling grant containing a DCI in accordance with one embodiment.

FIG. 3 illustrates a flowchart of a method 300 for a UE to apply a power saving enhancement, including skipping and switching, using a downlink scheduling grant containing a DCI. A UE implementing the method 300 may receive 302 a downlink scheduling grant comprising a downlink control information (DCI) message. The DCI message may indicate that the UE should apply a change in monitoring behavior.

The UE may send an ACK or a NACK depending on whether the UE successfully decoded 304 the DCI. The UE may generate and transmit 306 a NACK message when the UE fails to correctly decode the DCI or when the UE did not decode the PDSCH. The switching or skipping command from the DCI may be considered canceled until the UE successfully receives 308 a retransmission of the DCI message indicating that the UE should apply the skipping or the switching.

The UE may generate and transmit 310 an ACK message to indicate that the DCI message was received and PDSCH is correctly decoded. The ACK message may serve as a reference point for determining when to implement the monitoring behavior change. The UE may determine 312 a processing time for the change in monitoring behavior. In some embodiments, the processing time may be one of T_switching, T_switching_1, T_skipping, T_skipping_1, T_ack, and drx-HARQ-RTT-TimerDL. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL. The UE may apply 314 the change in monitoring behavior when an amount of time equivalent to the processing time has elapsed after the ACK message was transmitted.

Figure 4:
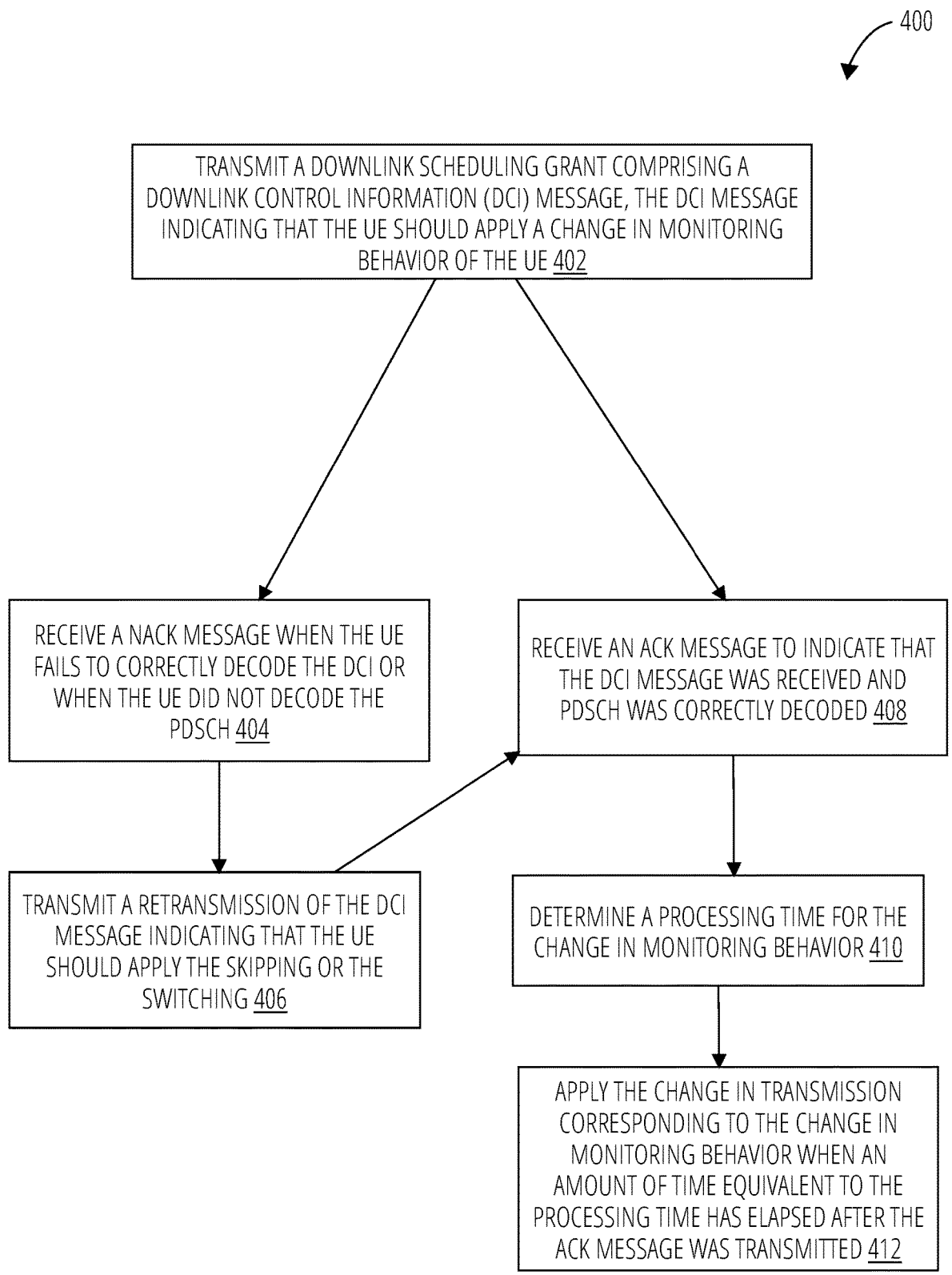
FIG. 4 illustrates a flowchart of a method for a network node to apply a power saving enhancement, including skipping and switching, using a downlink scheduling grant containing a DCI in accordance with one embodiment.

FIG. 4 illustrates a flowchart of a method 400 for a network node to apply a power saving enhancement, including skipping and switching, using a downlink scheduling grant containing a DCI. A network node implementing the method 400 may transmit 402 a downlink scheduling grant comprising a downlink control information (DCI) message. The DCI message may indicate that a UE should apply a change in monitoring behavior.

The network node may receive an ACK or a NACK depending on whether the UE successfully decoded the DCI. The network node may receive 404 a NACK message when the when the UE fails to correctly decode the DCI or when the UE did not decode the PDSCH. The switching or skipping command from the DCI may be considered canceled. The network node may transmit 406 a retransmission of the DCI message indicating that the UE should apply the skipping or the switching.

The network node may receive 408 an ACK message indicating that the DCI message was received and PDSCH is correctly decoded. The ACK message may serve as a reference point for determining when to implement the monitoring behavior change. The network node may determine 410 a processing time for the change in monitoring behavior. In some embodiments, the processing time may be one of T_switching, T_switching_1, T_skipping, T_skipping_1, T_ack, and drx-HARQ-RTT-TimerDL. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL. The network node may apply 314 changes to transmission timing to correspond to the change in monitoring behavior when an amount of time equivalent to the processing time has elapsed after the ACK message was transmitted.

Figure 5:
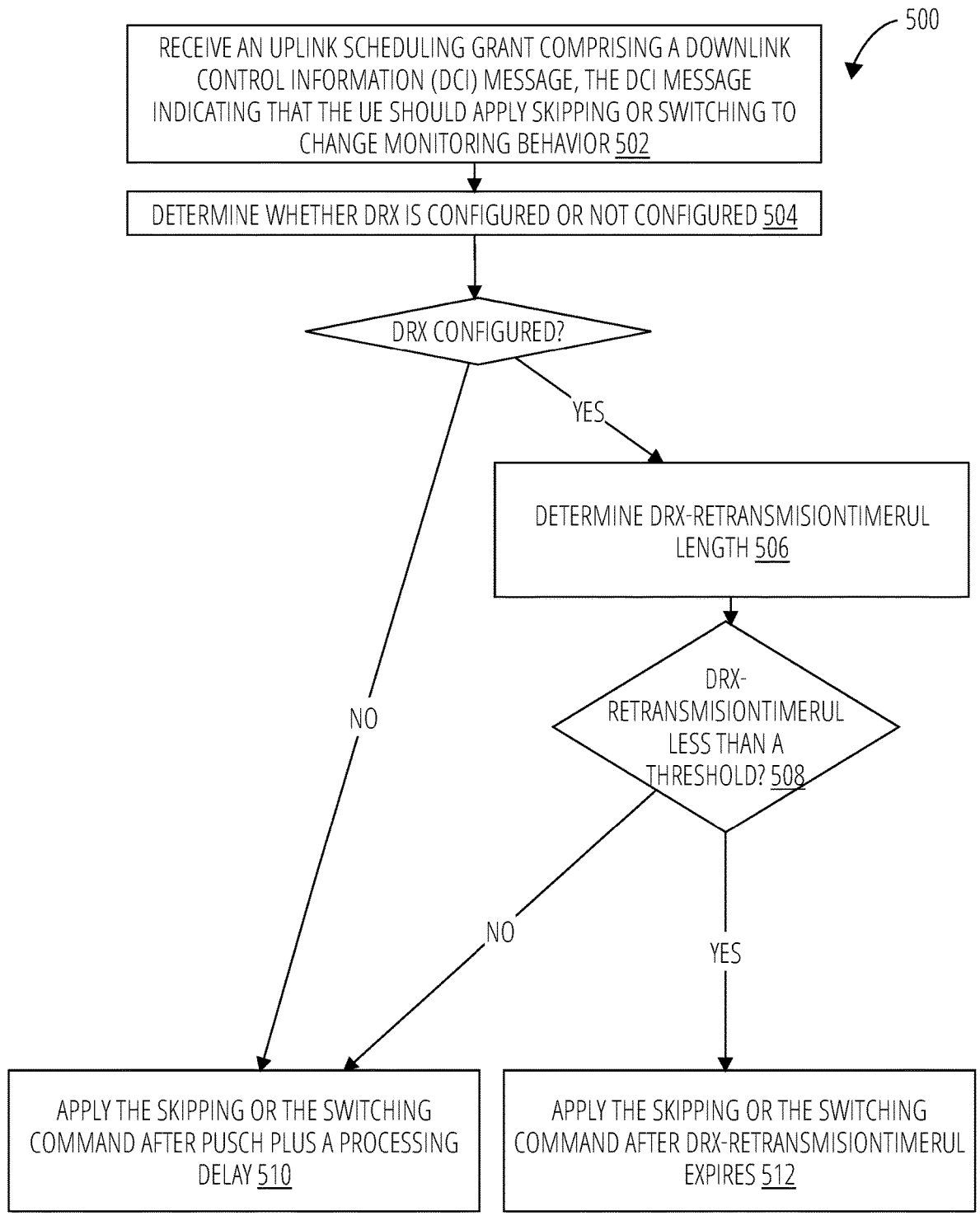
FIG. 5 illustrates a method for a UE to apply a power saving enhancement, including skipping and switching, using an uplink scheduling grant including a DCI in accordance with one embodiment.
Figure 6:
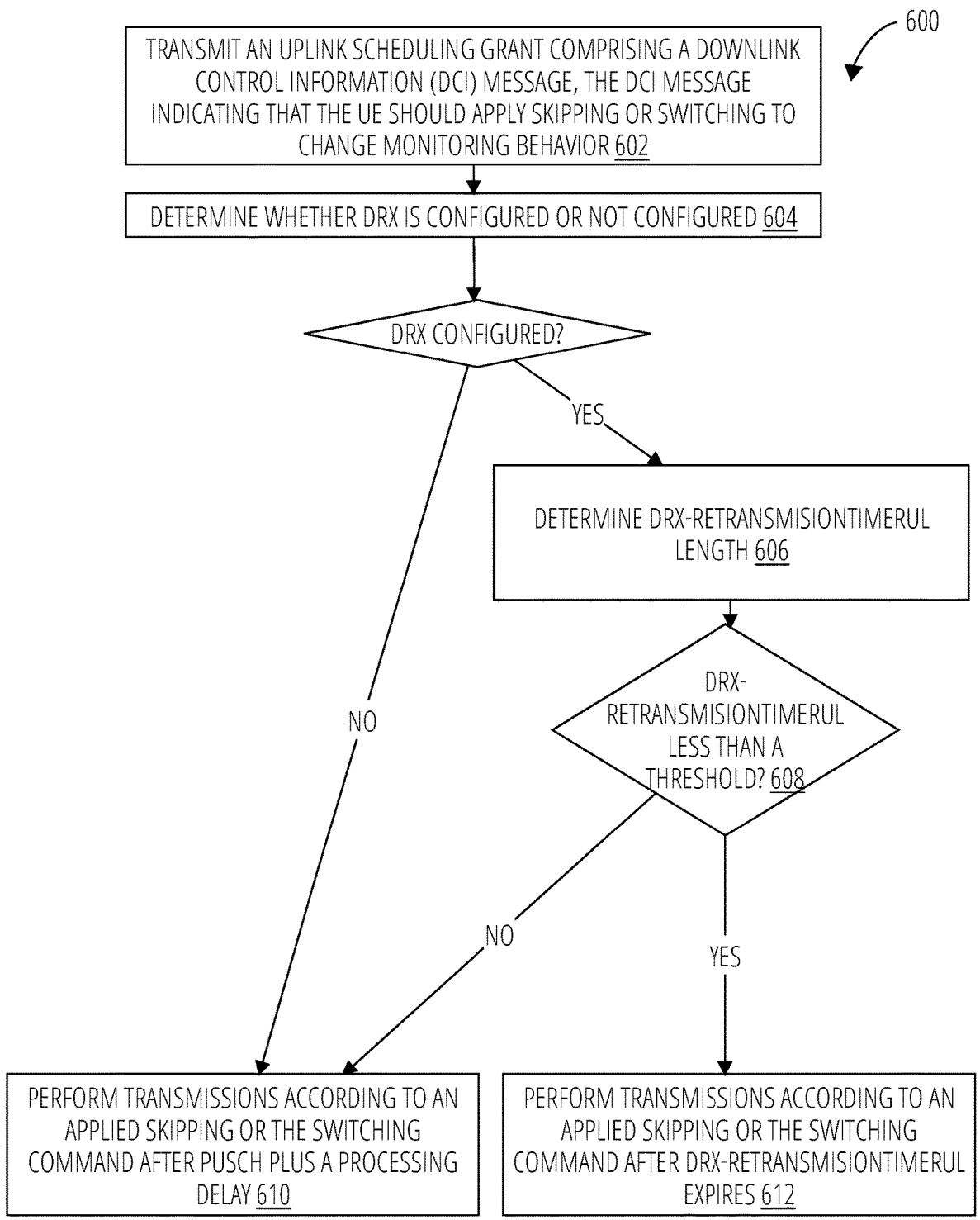
FIG. 6 illustrates a method for a network node to apply a power saving enhancement, including skipping and switching, using an uplink scheduling grant including a DCI in accordance with one embodiment.

FIGS. 5 and 6 illustrate methods for applying PDCCH monitoring skipping or switching signaled by an uplink scheduling grant including a DCI. The DCI may be DCI Format 0-1 and 0-2. In new radio, there is no ACK/NACK for uplink transmission. Instead Async HARQ retransmission has been adopted. Accordingly, the reference point may be after the PUSCH transmission or after drx-RetransmissionTimerUL (e.g., re-transmission timer for uplink retransmission) expires rather than an ACK/NACK message.

FIG. 5 illustrates a method 500 for a UE to apply a power saving enhancement, including skipping and switching, using an uplink scheduling grant including a DCI. A UE implementing the method 500 may receive 502 an uplink scheduling grant comprising a downlink control information (DCI) message. The DCI message may indicate that the UE should apply a change in monitoring behavior. The UE may determine 504 whether DRX is configured or not configured.

When DRX is configured, and DRX-retransmission timer is small, the UE apply the skipping or switching command after timer expire. Otherwise, the UE may apply the skipping or switching command after PUSCH transmission plus processing time. As shown, the UE may determine 506 the drx-RetransmissionTimerUL length and compare 508 the length to a threshold. In some embodiments, the threshold may be 8 slots.

If the drx-RetransmissionTimerUL length is less than the threshold, the skipping or switching may be applied 512 after the drx-RetransmisionTimerUL expires to limit impact of retransmission delay. In some embodiments, a processing delay may be added after the timer expires before the skipping or switching is applied. The processing delay may be T_switching or T_switching_1, or T_skipping or T_skipping_1 based on whether the command is a skipping or switching command. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL.

If the drx-RetransmissionTimerUL is larger than a threshold, application 510 of the skipping or switching command may occur after a PUSCH transmission and a processing delay. In some embodiments, the processing time may be one of T_switching, T_switching_1, T_skipping, T_skipping_1, T_ack, and drx-HARQ-RTT-TimerDL. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL.

When DRX is not configured, then there may be no re-transmission timer for uplink retransmission. Instead, the UE may apply 510 the skipping or switching command after PUSCH transmission plus a processing time. Processing delay can be either based on UE processing, network node processing, or a combination of UE processing and network node processing. In some embodiments, the processing time may be one of T_switching, T_switching_1, T_skipping, T_skipping_1, T_ack, and drx-HARQ-RTT-TimerDL. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL.

FIG. 6 illustrates a method 600 for a network node to apply a power saving enhancement, including skipping and switching, using an uplink scheduling grant including a DCI. A network node implementing the method 600 may transmit 602 an uplink scheduling grant comprising a downlink control information (DCI) message. The DCI message may indicate that the UE should apply a change in monitoring behavior. The network node may determine 604 whether DRX is configured or not configured.

When DRX is configured, and DRX-retransmission timer is small, the network node may perform transmissions according to the skipping or switching command after timer expire. Otherwise, the network node may perform transmissions according to an applied skipping or switching command after PUSCH transmission plus processing time. As shown, the network node may determine 606 the drx-RetransmissionTimerUL length and compare 608 the length to a threshold. In some embodiments, the threshold may be 8 slots.

If the drx-RetransmissionTimerUL length is less than the threshold, the skipping or switching may be applied 612 after the drx-RetransmisionTimerUL expires to limit impact of retransmission delay. In some embodiments, a processing delay may be added after the timer expires before the skipping or switching is applied. If the drx-RetransmissionTimerUL is larger than a threshold, application 610 of the skipping or switching command may occur after a PUSCH transmission and a processing delay. When DRX is not configured, then there may be no re-transmission timer for uplink retransmission. Instead, the network node may apply 610 perform transmissions according to the skipping or switching command after PUSCH transmission plus a processing time.

Processing delay can be either based on UE processing, network node processing, or a combination of UE processing and network node processing. In some embodiments, the processing time may be one of T_switching, T_switching_1, T_skipping, T_skipping_1, T_ack, and drx-HARQ-RTT-TimerDL. In some embodiments, the processing delay may always be T_switching or T_switching_1 regardless of whether the command is a switching or a skipping command. In some embodiments, the processing time may be a maximum of two or more of T_switching, T_switching_1, T_skipping, T_skipping_1, T_ack, and drx-HARQ-RTT-TimerDL.

Figure 7:
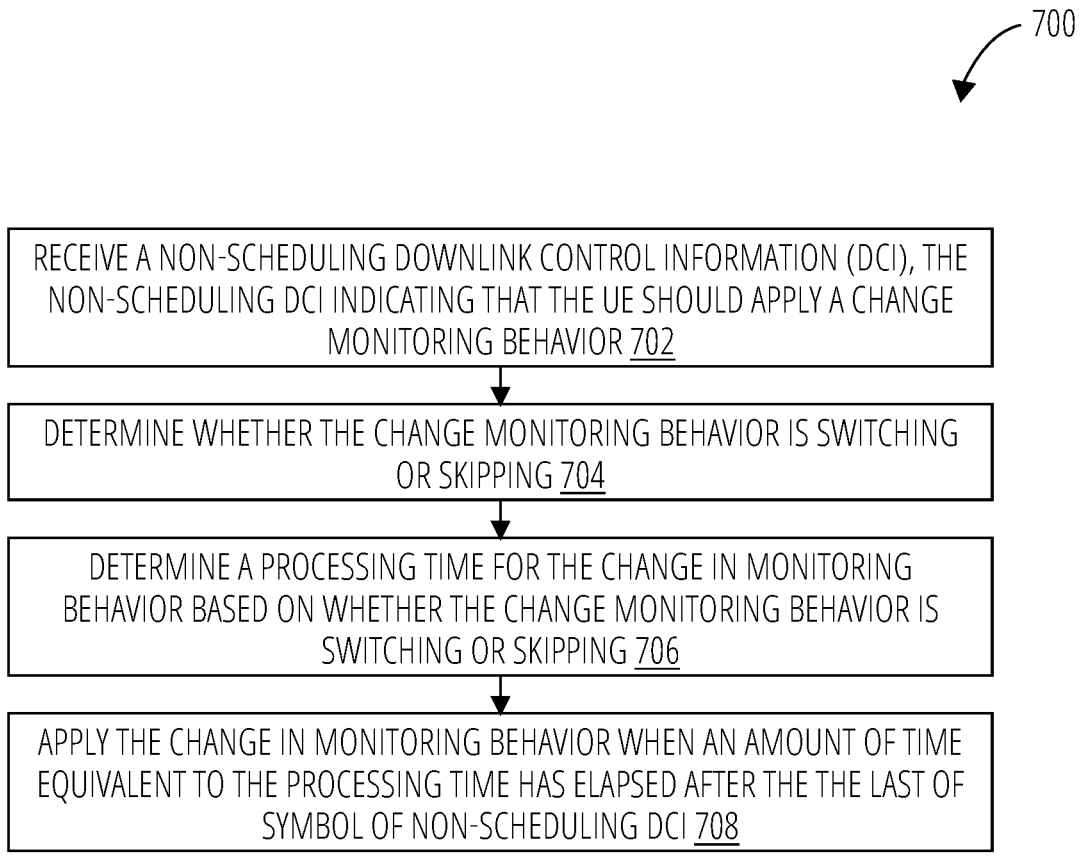
FIG. 7 illustrates a method for a UE to apply a power saving enhancement, including skipping and switching, using a non-scheduling DCI in accordance with one embodiment.

FIG. 7 illustrates a method 700 for a UE to apply a power saving enhancement, including skipping and switching, using a non-scheduling DCI. The DCI may be DCI Format 2-0, 2-6 or 1-1. The reference point may be the last symbol off the DCI. A network node may prepare and transmit a non-scheduling downlink control information (DCI), the non-scheduling DCI indicating that the UE should apply a change monitoring behavior. A UE implementing the method 700 may receive 702 the non-scheduling DCI.

The UE may determine 704 whether the change monitoring behavior is switching or skipping. The UE may also determine 706 a processing time for the change in monitoring behavior based on whether the change monitoring behavior is switching or skipping. The UE may apply 708 the change in monitoring behavior when an amount of time equivalent to the processing time has elapsed after the last of symbol of non-scheduling DCI. Similarly, the network node may determine when the UE is monitoring and adjust future transmissions based on when the switching or skipping is applied by the UE based on the last symbol of the DCI plus the processing time. The processing time may be T_skipping or T_switching For example, when skipping is triggered, the command may be applied (e.g., skipping) from the last of symbol of DCI plus T_skipping. When switching is triggering, the command may be applied (e.g., switching) from the last of symbol of DCI plus T_switching. In some embodiments, when both skipping and switching are triggered using one commend, the monitoring behavior change may be applied from the last of symbol of DCI+T_switching.

In some embodiments, the UE may handle miss-detected non-scheduling DCI in the following way. The search space configuration may ensure the sparse pattern is a subset of the dense pattern. In this way, the same coreset and DCI formats may be used. In these embodiments, when The DCI indicates that the UE should skipping or switching from dense pattern to sparse pattern and the UE misses the DCI, the UE may not have power saving gain but no issue of missing PDCCH.

However, when the DCI is missed and indicates a switch from a sparse pattern to a dense pattern many following DCI may be missed due to mismatch of monitoring pattern. To handle this, a first embodiment may use an RRC to configure a switching timer, when timer expire, UE fall back to sparse pattern. Thereby limiting missed DCIs. Some embodiments may enable a UE to send an ACK to the DCI. If the ACK is not sent for the non-scheduling DCI, the network node may assume that the non-scheduling DCI was missed and send another. In some embodiments, the network node may send the new dense search space configuration multiple times to ensure UE correctly receives it. In some embodiments, a transition period may be defined that uses sparse configuration to send the DCI.

Figure 8:
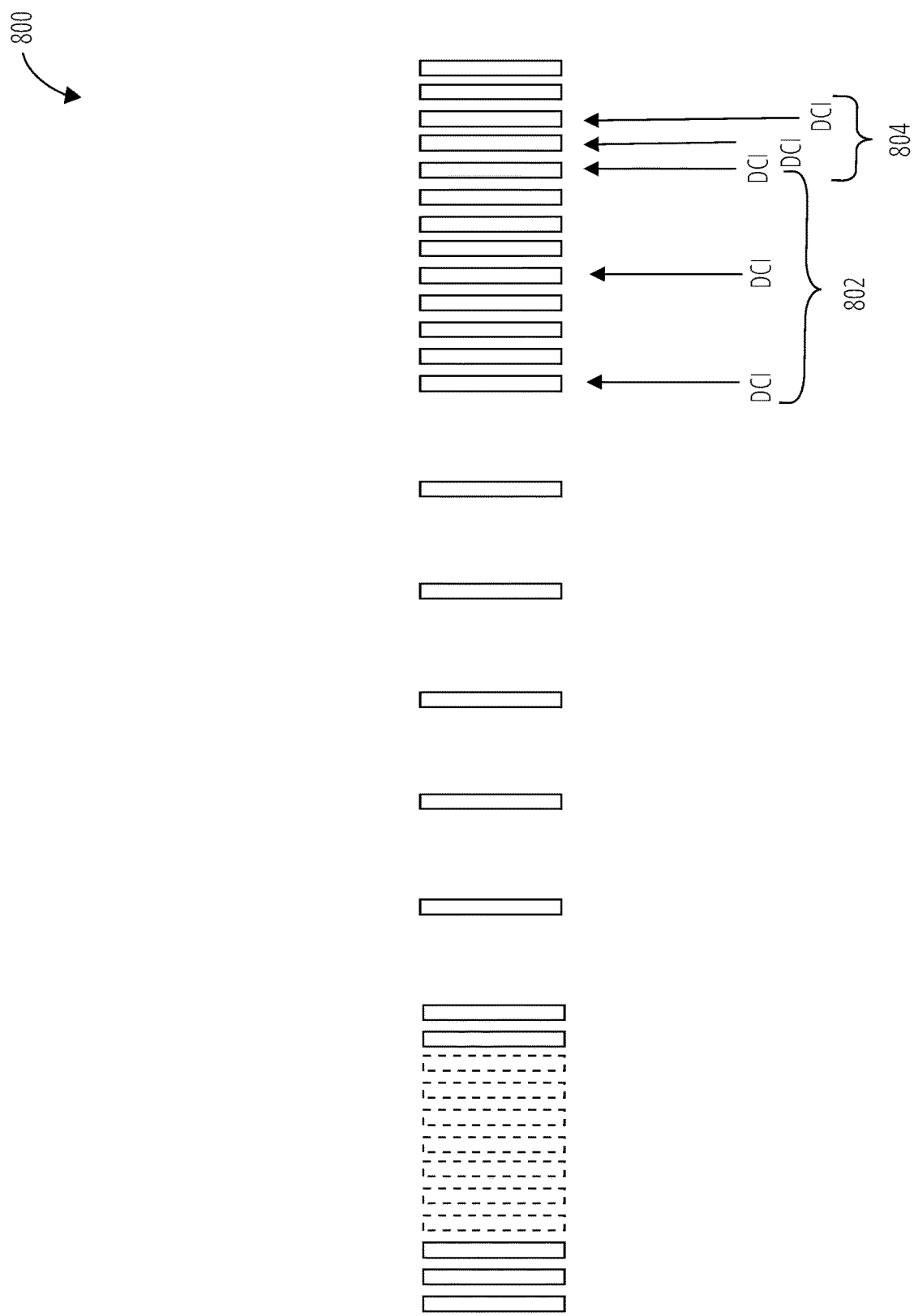
FIG. 8 illustrates an example monitoring timeline in which during a transition period a network node sends the DCI using a sparse configuration in accordance with one embodiment.

For example, FIG. 8 illustrates an example monitoring timeline 800 in which during a transition period 802 a network node sends the DCI using a sparse configuration. As shown, even though the monitoring behavior of the UE has transitioned to a dense pattern, the network node continues to send the DCI according to the sparse pattern during the transition period 802. Then during the second period 804, the DCI may be sent according to the dense configuration.

Figure 9:
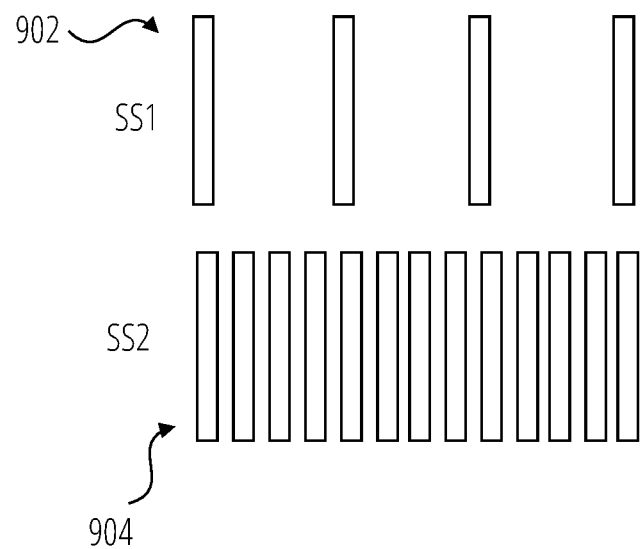
FIG. 9 illustrates a timeline in which the sparse pattern is not a subset of the dense pattern in accordance with one embodiment.

FIG. 9 illustrates a timeline in which the sparse pattern 902 is not a subset of the dense pattern 904. In this embodiment, the sparse pattern 902 is not a subset of dense pattern 904. There may be no configuration limitation for CoreSet, DCI Format, offset etc. There may be periodicity. For example, one search space is sparse, one search space is dense. When total search space configuration is within a limit of the UE features: 3-1 (e.g., 3 SS per Scell), or 3-8 (e.g., 10 search space per Scell). In some embodiments, the network node and UE may use activation and deactivation of different search space instead of switching. For example, SS1 may be 1-1 and SS2 may be 1-2. If SS1 has a trigger activation and deactivation of SS2 for Ultra-reliable and low-latency communications (URLLC) traffic. The UE can use both span and periodicity together to create different SS configuration.

Figure 10:
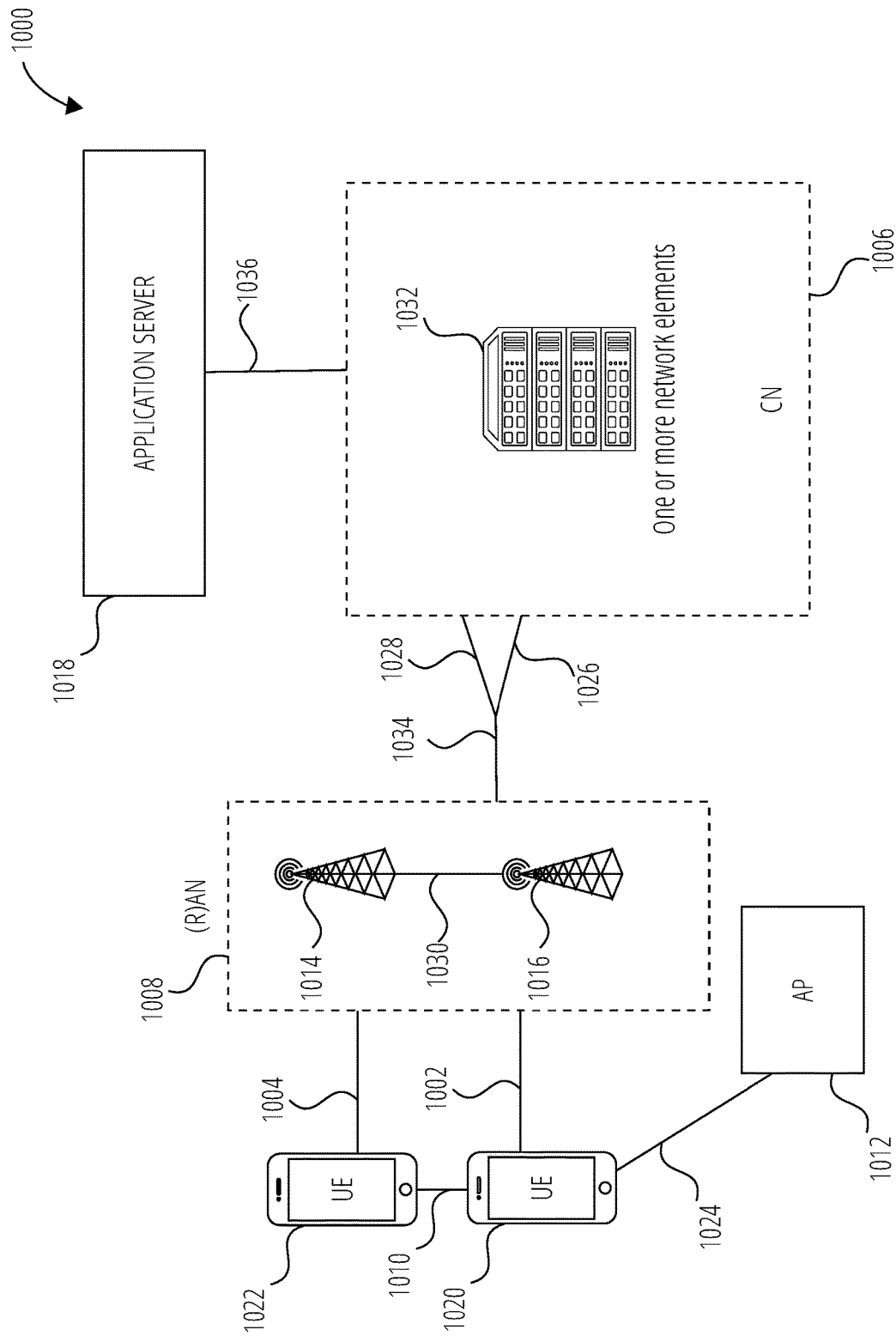
FIG. 10 illustrates a system in accordance with one embodiment.

FIG. 10 illustrates an example architecture of a system 1000 of a network, in accordance with various embodiments. The following description is provided for an example system 1000 that operates in conjunction with the LTE system standards and 5G or NR system standards as provided by 3GPP technical specifications. However, the example embodiments are not limited in this regard and the described embodiments may apply to other networks that benefit from the principles described herein, such as future 3GPP systems (e.g., Sixth Generation (6G)) systems, IEEE 802.16 protocols (e.g., WMAN, WiMAX, etc.), or the like.

As shown by FIG. 10, the system 1000 includes UE 1022 and UE 1020. In this example, the UE 1022 and the UE 1020 are illustrated as smartphones (e.g., handheld touchscreen mobile computing devices connectable to one or more cellular networks), but may also comprise any mobile or non-mobile computing device. In some embodiments, the UE 1022 and/or the UE 1020 may be IoT UEs, which may comprise a network access layer designed for low power IoT applications utilizing short-lived UE connections.

The UE 1022 and UE 1020 may be configured to connect, for example, communicatively couple, with an access node or radio access node (shown as (R)AN 1008). In embodiments, the (R)AN 1008 may be an NG RAN or a 5G RAN, an E-UTRAN, or a legacy RAN, such as a UTRAN or GERAN. As used herein, the term "NG RAN" or the like may refer to a (R)AN 1008 that operates in an NR or 5G system, and the term "E-UTRAN" or the like may refer to a (R)AN 1008 that operates in an LTE or 4G system. The UE 1022 and UE 1020 utilize connections (or channels) (shown as connection 1004 and connection 1002, respectively), each of which comprises a physical communications interface or layer (discussed in further detail below).

In this example, the connection 1004 and connection 1002 are air interfaces to enable communicative coupling, and can be consistent with cellular communications protocols, such as a GSM protocol, a CDMA network protocol, a PTT protocol, a POC protocol, a UMTS protocol, a 3GPP LTE protocol, a 5G protocol, a NR protocol, and/or any of the other communications protocols discussed herein. In embodiments, the UE 1022 and UE 1020 may directly exchange communication data via a ProSe interface 1010. The ProSe interface 1010 may alternatively be referred to as a sidelink (SL) interface 110 and may comprise one or more logical channels, including but not limited to a PSCCH, a PSSCH, a PSDCH, and a PSBCH.

The UE 1020 is shown to be configured to access an AP 1012 (also referred to as "WLAN node," "WLAN," "WLAN Termination," "WT" or the like) via connection 1024. The connection 1024 can comprise a local wireless connection, such as a connection consistent with any IEEE 802.11 protocol, wherein the AP 1012 would comprise a wireless fidelity (Wi-Fi®) router. In this example, the AP 1012 may be connected to the Internet without connecting to the core network of the wireless system (described in further detail below).

The (R)AN 1008 can include one or more AN nodes, such as RAN node 1014 and RAN node 1016, that enable the connection 1004 and connection 1002. As used herein, the terms "access node," "access point," or the like may describe equipment that provides the radio baseband functions for data and/or voice connectivity between a network and one or more users. These access nodes can be referred to as BS, gNBs, RAN nodes, eNBs, NodeBs, RSUs TRxPs or TRPs, and so forth, and can comprise ground stations (e.g., terrestrial access points) or satellite stations providing coverage within a geographic area (e.g., a cell). As used herein, the term "NG RAN node" or the like may refer to a RAN node that operates in an NR or 5G system (for example, a gNB), and the term "E-UTRAN node" or the like may refer to a RAN node that operates in an LTE or 4G system 1000 (e.g., an eNB). According to various embodiments, the RAN node 1014 or RAN node 1016 may be implemented as one or more of a dedicated physical device such as a macrocell base station, and/or a low power (LP) base station for providing femtocells, picocells or other like cells having smaller coverage areas, smaller user capacity, or higher bandwidth compared to macrocells.

The PDSCH carries user data and higher-layer signaling to the UE 1022 and UE 1020. The PDCCH carries information about the transport format and resource allocations related to the PDSCH channel, among other things. It may also inform the UE 1022 and UE 1020 about the transport format, resource allocation, and HARQ information related to the uplink shared channel. Typically, downlink scheduling (assigning control and shared channel resource blocks to the UE 1020 within a cell) may be performed at any of the RAN node 1014 or RAN node 1016 based on channel quality information fed back from any of the UE 1022 and UE 1020. The downlink resource assignment information may be sent on the PDCCH used for (e.g., assigned to) each of the UE 1022 and UE 1020.

The PDCCH uses CCEs to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as REGs. Four Quadrature Phase Shift Keying (QPSK) symbols may be mapped to each REG. The PDCCH can be transmitted using one or more CCEs, depending on the size of the DCI and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an EPDCCH that uses PDSCH resources for control information transmission. The EPDCCH may be transmitted using one or more ECCEs. Similar to above, each ECCE may correspond to nine sets of four physical resource elements known as an EREGs. An ECCE may have other numbers of EREGs in some situations.

The RAN node 1014 or RAN node 1016 may be configured to communicate with one another via interface 1030.

In embodiments where the system 1000 is a 5G or NR system (e.g., when CN 1006 is an 5GC), the interface 1030 may be an Xn interface. The Xn interface is defined between two or more RAN nodes (e.g., two or more gNBs and the like) that connect to 5GC, between a RAN node 1014 (e.g., a gNB) connecting to 5GC and an eNB, and/or between two eNBs connecting to 5GC (e.g., CN 1006). In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for UE 1022 in a connected mode (e.g., CM-CONNECTED) including functionality to manage the UE mobility for connected mode between one or more RAN node 1014 or RAN node 1016. The mobility support may include context transfer from an old (source) serving RAN node 1014 to new (target) serving RAN node 1016; and control of user plane tunnels between old (source) serving RAN node 1014 to new (target) serving RAN node 1016. A protocol stack of the Xn-U may include a transport network layer built on Internet Protocol (IP) transport layer, and a GTP-U layer on top of a UDP and/or IP layer(s) to carry user plane PDUs. The Xn-C protocol stack may include an application layer signaling protocol (referred to as Xn Application Protocol (Xn-AP)) and a transport network layer that is built on SCTP. The SCTP may be on top of an IP layer, and may provide the guaranteed delivery of application layer messages. In the transport IP layer, point-to-point transmission is used to deliver the signaling PDUs. In other implementations, the Xn-U protocol stack and/or the Xn-C protocol stack may be same or similar to the user plane and/or control plane protocol stack(s) shown and described herein.

The (R)AN 1008 is shown to be communicatively coupled to a core network—in this embodiment, CN 1006. The CN 1006 may comprise one or more network elements 1032, which are configured to offer various data and telecommunications services to customers/subscribers (e.g., users of UE 1022 and UE 1020) who are connected to the CN 1006 via the (R)AN 1008. The components of the CN 1006 may be implemented in one physical node or separate physical nodes including components to read and execute instructions from a machine-readable or computer-readable medium (e.g., a non-transitory machine-readable storage medium). In some embodiments, NFV may be utilized to virtualize any or all of the above-described network node functions via executable instructions stored in one or more computer-readable storage mediums (described in further detail below). A logical instantiation of the CN 1006 may be referred to as a network slice, and a logical instantiation of a portion of the CN 1006 may be referred to as a network sub-slice. NFV architectures and infrastructures may be used to virtualize one or more network functions, alternatively performed by proprietary hardware, onto physical resources comprising a combination of industry-standard server hardware, storage hardware, or switches. In other words, NFV systems can be used to execute virtual or reconfigurable implementations of one or more EPC components/functions.

Generally, an application server 1018 may be an element offering applications that use IP bearer resources with the core network (e.g., UMTS PS domain, LTE PS data services, etc.). The application server 1018 can also be configured to support one or more communication services (e.g., VoIP sessions, PTT sessions, group communication sessions, social networking services, etc.) for the UE 1022 and UE 1020 via the EPC. The application server 1018 may communicate with the CN 1006 through an IP communications interface 1036.

In embodiments, the CN 1006 may be an SGC, and the (R)AN 116 may be connected with the CN 1006 via an NG interface 1034. In embodiments, the NG interface 1034 may be split into two parts, an NG user plane (NG-U) interface 1026, which carries traffic data between the RAN node 1014 or RAN node 1016 and a UPF, and the S1 control plane (NG-C) interface 1028, which is a signaling interface between the RAN node 1014 or RAN node 1016 and AMFs.

In embodiments, the CN 1006 may be a SG CN, while in other embodiments, the CN 1006 may be an EPC). Where CN 1006 is an EPC, the (R)AN 116 may be connected with the CN 1006 via an S1 interface 1034. In embodiments, the S1 interface 1034 may be split into two parts, an S1 user plane (S1-U) interface 1026, which carries traffic data between the RAN node 1014 or RAN node 1016 and the S-GW, and the S1-MME interface 1028, which is a signaling interface between the RAN node 1014 or RAN node 1016 and MMEs.

Figure 11:
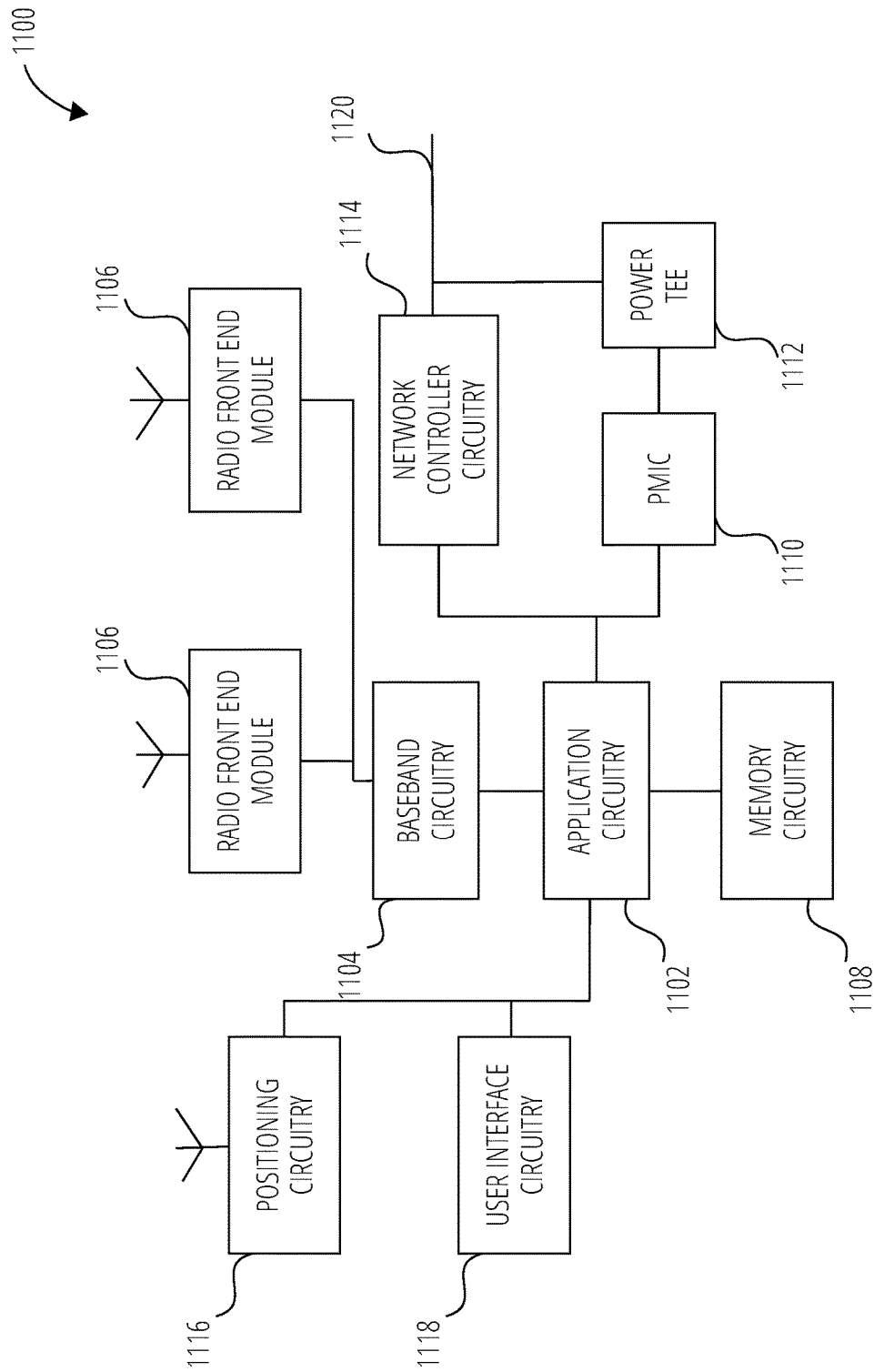
FIG. 11 illustrates an infrastructure equipment in accordance with one embodiment.

FIG. 11 illustrates an example of infrastructure equipment 1100 in accordance with various embodiments. The infrastructure equipment 1100 may be implemented as a base station, radio head, RAN node, AN, application server, and/or any other element/device discussed herein. In other examples, the infrastructure equipment 1100 could be implemented in or by a UE.

The infrastructure equipment 1100 includes application circuitry 1102, baseband circuitry 1104, one or more radio front end module 1106 (RFEM), memory circuitry 1108, power management integrated circuitry (shown as PMIC 1110), power tee circuitry 1112, network controller circuitry 1114, network interface connector 1120, satellite positioning circuitry 1116, and user interface circuitry 1118. In some embodiments, the device infrastructure equipment 1100 may include additional elements such as, for example, memory/storage, display, camera, sensor, or input/output (I/O) interface. In other embodiments, the components described below may be included in more than one device. For example, said circuitries may be separately included in more than one device for CRAN, vBBU, or other like implementations. Application circuitry 1102 includes circuitry such as, but not limited to one or more processors (or processor cores), cache memory, and one or more of low drop-out voltage regulators (LDOs), interrupt controllers, serial interfaces such as SPI, I$^2$C or universal programmable serial interface module, real time clock (RTC), timer-counters including interval and watchdog timers, general purpose input/output (I/O or IO), memory card controllers such as Secure Digital (SD) MultiMediaCard (MMC) or similar, Universal Serial Bus (USB) interfaces, Mobile Industry Processor Interface (MIPI) interfaces and Joint Test Access Group (JTAG) test access ports. The processors (or cores) of the application circuitry 1102 may be coupled with or may include memory/storage elements and may be configured to execute instructions stored in the memory/storage to enable various applications or operating systems to run on the infrastructure equipment 1100. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1102 may include, for example, one or more processor cores (CPUs), one or more application processors, one or more graphics processing units (GPUs), one or more reduced instruction set computing (RISC) processors, one or more Acorn RISC Machine (ARM) processors, one or more complex instruction set computing (CISC) processors, one or more digital signal processors (DSP), one or more FPGAs, one or more PLDs, one or more ASICs, one or more microprocessors or controllers, or any suitable combination thereof.

In some implementations, the application circuitry 1102 may include one or more hardware accelerators, which may be microprocessors, programmable processing devices, or the like. The one or more hardware accelerators may include, for example, computer vision (CV) and/or deep learning (DL) accelerators. As examples, the programmable processing devices may be one or more a field-programmable devices (FPDs) such as field-programmable gate arrays (FPGAs) and the like; programmable logic devices (PLDs) such as complex PLDs (CPLDs), high-capacity PLDs (HCPLDs), and the like; ASICs such as structured ASICs and the like; programmable SoCs (PSoCs); and the like. In such implementations, the circuitry of application circuitry 1102 may comprise logic blocks or logic fabric, and other interconnected resources that may be programmed to perform various functions, such as the procedures, methods, functions, etc. of the various embodiments discussed herein. In such embodiments, the circuitry of application circuitry 1102 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up-tables (LUTs) and the like. The baseband circuitry 1104 may be implemented, for example, as a solder-down substrate including one or more integrated circuits, a single packaged integrated circuit soldered to a main circuit board or a multi-chip module containing two or more integrated circuits.

The user interface circuitry 1118 may include one or more user interfaces designed to enable user interaction with the infrastructure equipment 1100 or peripheral component interfaces designed to enable peripheral component interaction with the infrastructure equipment 1100. User interfaces may include, but are not limited to, one or more physical or virtual buttons (e.g., a reset button), one or more indicators (e.g., light emitting diodes (LEDs)), a physical keyboard or keypad, a mouse, a touchpad, a touchscreen, speakers or other audio emitting devices, microphones, a printer, a scanner, a headset, a display screen or display device, etc. Peripheral component interfaces may include, but are not limited to, a nonvolatile memory port, a universal serial bus (USB) port, an audio jack, a power supply interface, etc.

The radio front end module 1106 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1106, which incorporates both mmWave antennas and sub-mmWave.

The memory circuitry 1108 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magnetoresistive random access memory (MRAM), etc., and may incorporate the three-dimensional (3D) cross-point (XPOINT) memories from Intel® and Micron®. The memory circuitry 1108 may be implemented as one or more of solder down packaged integrated circuits, socketed memory modules and plug-in memory cards.

The PMIC 1110 may include voltage regulators, surge protectors, power alarm detection circuitry, and one or more backup power sources such as a battery or capacitor. The power alarm detection circuitry may detect one or more of brown out (under-voltage) and surge (over-voltage) conditions. The power tee circuitry 1112 may provide for electrical power drawn from a network cable to provide both power supply and data connectivity to the infrastructure equipment 1100 using a single cable.

The network controller circuitry 1114 may provide connectivity to a network using a standard network interface protocol such as Ethernet, Ethernet over GRE Tunnels, Ethernet over Multiprotocol Label Switching (MPLS), or some other suitable protocol. Network connectivity may be provided to/from the infrastructure equipment 1100 via network interface connector 1120 using a physical connection, which may be electrical (commonly referred to as a "copper interconnect"), optical, or wireless. The network controller circuitry 1114 may include one or more dedicated processors and/or FPGAs to communicate using one or more of the aforementioned protocols. In some implementations, the network controller circuitry 1114 may include multiple controllers to provide connectivity to other networks using the same or different protocols. The positioning circuitry 1116 includes circuitry to receive and decode signals transmitted/broadcasted by a positioning network of a global navigation satellite system.

Figure 12:
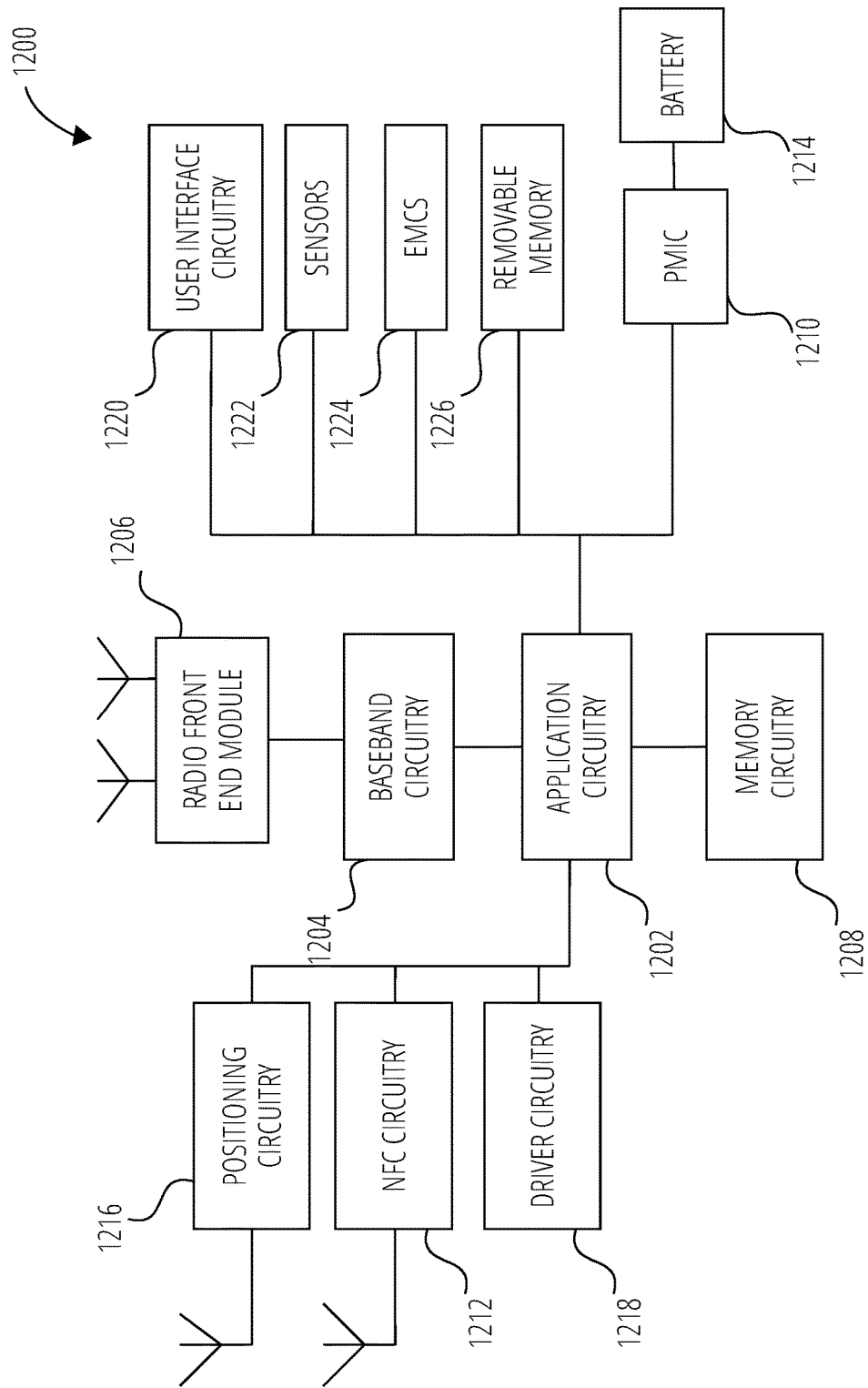
FIG. 12 illustrates a platform in accordance with one embodiment.

FIG. 12 illustrates an example of a platform 1200 in accordance with various embodiments. In embodiments, the computer platform 1200 may be suitable for use as UEs, application servers, and/or any other element/device discussed herein. The platform 1200 may include any combinations of the components shown in the example. The components of platform 1200 may be implemented as integrated circuits (ICs), portions thereof, discrete electronic devices, or other modules, logic, hardware, software, firmware, or a combination thereof adapted in the computer platform 1200, or as components otherwise incorporated within a chassis of a larger system. The block diagram of FIG. 12 is intended to show a high level view of components of the computer platform 1200. However, some of the components shown may be omitted, additional components may be present, and different arrangement of the components shown may occur in other implementations.

Application circuitry 1202 includes circuitry such as, but not limited to one or more processors (or processor cores), cache memory, and one or more of LDOs, interrupt controllers, serial interfaces such as SPI, I$^2$C or universal programmable serial interface module, RTC, timer-counters including interval and watchdog timers, general purpose IO, memory card controllers such as SD MMC or similar, USB interfaces, MIPI interfaces, and JTAG test access ports. The processors (or cores) of the application circuitry 1202 may be coupled with or may include memory/storage elements and may be configured to execute instructions stored in the memory/storage to enable various applications or operating systems to run on the platform 1200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 1202 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 1202 may comprise, or may be, a special-purpose processor/controller to operate according to the various embodiments herein.

Additionally or alternatively, application circuitry 1202 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like;

programmable SoCs (PSoCs); and the like. In such embodiments, the circuitry of application circuitry 1202 may comprise logic blocks or logic fabric, and other interconnected resources that may be programmed to perform various functions, such as the procedures, methods, functions, etc. of the various embodiments discussed herein. In such embodiments, the circuitry of application circuitry 1202 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 1204 may be implemented, for example, as a solder-down substrate including one or more integrated circuits, a single packaged integrated circuit soldered to a main circuit board or a multi-chip module containing two or more integrated circuits.

The radio front end module 1206 may comprise a millimeter wave (mmWave) radio front end module (RFEM) and one or more sub-mmWave radio frequency integrated circuits (RFICs). In some implementations, the one or more sub-mmWave RFICs may be physically separated from the mmWave RFEM. The RFICs may include connections to one or more antennas or antenna arrays, and the RFEM may be connected to multiple antennas. In alternative implementations, both mmWave and sub-mmWave radio functions may be implemented in the same physical radio front end module 1206, which incorporates both mmWave antennas and sub-mmWave.

The memory circuitry 1208 may include any number and type of memory devices used to provide for a given amount of system memory. As examples, the memory circuitry 1208 may include one or more of volatile memory including random access memory (RAM), dynamic RAM (DRAM) and/or synchronous dynamic RAM (SD RAM), and non-volatile memory (NVM) including high-speed electrically erasable memory (commonly referred to as Flash memory), phase change random access memory (PRAM), magnetoresistive random access memory (MRAM), etc. The memory circuitry 1208 may be developed in accordance with a Joint Electron Devices Engineering Council (JEDEC) low power double data rate (LPDDR)-based design, such as LPDDR2, LPDDR3, LPDDR4, or the like. Memory circuitry 1208 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 1208 maybe on-die memory or registers associated with the application circuitry 1202. To provide for persistent storage of information such as data, applications, operating systems and so forth, memory circuitry 1208 may include one or more mass storage devices, which may include, inter alia, a solid state disk drive (SSDD), hard disk drive (HDD), a microHDD, resistance change memories, phase change memories, holographic memories, or chemical memories, among others. For example, the computer platform 1200 may incorporate the three-dimensional (3D) cross-point (XPOINT) memories from Intel® and Micron®.

The removable memory 1226 may include devices, circuitry, enclosures/housings, ports or receptacles, etc. used to couple portable data storage devices with the platform 1200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 1200 may also include interface circuitry (not shown) that is used to connect external devices with the platform 1200. The external devices connected to the platform 1200 via the interface circuitry include sensors 1222 and electro-mechanical components (shown as EMCs 1224), as well as removable memory devices coupled to removable memory 1226.

The sensors 1222 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 1224 include devices, modules, or subsystems whose purpose is to enable platform 1200 to change its state, position, and/or orientation, or move or control a mechanism or (sub)system. Additionally, EMCs 1224 may be configured to generate and send messages/signaling to other components of the platform 1200 to indicate a current state of the EMCs 1224. Examples of the EMCs 1224 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 1200 is configured to operate one or more EMCs 1224 based on one or more captured events and/or instructions or control signals received from a service provider and/or various clients. In some implementations, the interface circuitry may connect the platform 1200 with positioning circuitry 1216.

In some implementations, the interface circuitry may connect the platform 1200 with Near-Field Communication circuitry (shown as NFC circuitry 1212). The NFC circuitry 1212 is configured to provide contactless, short-range communications based on radio frequency identification (RFID) standards, wherein magnetic field induction is used to enable communication between NFC circuitry 1212 and NFC-enabled devices external to the platform 1200 (e.g., an "NFC touchpoint").

The driver circuitry 1218 may include software and hardware elements that operate to control particular devices that are embedded in the platform 1200, attached to the platform 1200, or otherwise communicatively coupled with the platform 1200. The driver circuitry 1218 may include individual drivers allowing other components of the platform 1200 to interact with or control various input/output (I/O) devices that may be present within, or connected to, the platform 1200. For example, driver circuitry 1218 may include a display driver to control and allow access to a display device, a touchscreen driver to control and allow access to a touchscreen interface of the platform 1200, sensor drivers to obtain sensor readings of sensors 1222 and control and allow access to sensors 1222, EMC drivers to obtain actuator positions of the EMCs 1224 and/or control and allow access to the EMCs 1224, a camera driver to control and allow access to an embedded image capture device, audio drivers to control and allow access to one or more audio devices.

The power management integrated circuitry (shown as PMIC 1210) (also referred to as "power management circuitry") may manage power provided to various components of the platform 1200. In particular, with respect to the baseband circuitry 1204, the PMIC 1210 may control power-source selection, voltage scaling, battery charging, or DC-to-DC conversion. The PMIC 1210 may often be included when the platform 1200 is capable of being powered by a battery 1214, for example, when the device is included in a UE.

In some embodiments, the PMIC 1210 may control, or otherwise be part of, various power saving mechanisms of the platform 1200. For example, if the platform 1200 is in an RRC_Connected state, where it is still connected to the RAN node as it expects to receive traffic shortly, then it may enter a state known as Discontinuous Reception Mode (DRX) after a period of inactivity. During this state, the platform 1200 may power down for brief intervals of time and thus save power. If there is no data traffic activity for an extended period of time, then the platform 1200 may transition off to an RRC_Idle state, where it disconnects from the network and does not perform operations such as channel quality feedback, handover, etc. The platform 1200 goes into a very low power state and it performs paging where again it periodically wakes up to listen to the network and then powers down again. The platform 1200 may not receive data in this state; in order to receive data, it must transition back to RRC_Connected state. An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

A battery 1214 may power the platform 1200, although in some examples the platform 1200 may be mounted deployed in a fixed location, and may have a power supply coupled to an electrical grid. The battery 1214 may be a lithium ion battery, a metal-air battery, such as a zinc-air battery, an aluminum-air battery, a lithium-air battery, and the like. In some implementations, such as in V2X applications, the battery 1214 may be a typical lead-acid automotive battery.

In some implementations, the battery 1214 may be a "smart battery," which includes or is coupled with a Battery Management System (BMS) or battery monitoring integrated circuitry. The BMS may be included in the platform 1200 to track the state of charge (SoCh) of the battery 1214.

A power block, or other power supply coupled to an electrical grid may be coupled with the BMS to charge the battery 1214. In some examples, the power block may be replaced with a wireless power receiver to obtain the power wirelessly, for example, through a loop antenna in the computer platform 1200. In these examples, a wireless battery charging circuit may be included in the BMS. The specific charging circuits chosen may depend on the size of the battery 1214, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 1220 includes various input/output (I/O) devices present within, or connected to, the platform 1200, and includes one or more user interfaces designed to enable user interaction with the platform 1200 and/or peripheral component interfaces designed to enable peripheral component interaction with the platform 1200. The user interface circuitry 1220 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position(s), or other like information. Output device circuitry may include any number and/or combinations of audio or visual display, including, inter alia, one or more simple visual outputs/indicators such as binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 1200. The output device circuitry may also include speakers or other audio emitting devices, printer(s), and/or the like. In some embodiments, the sensors 1222 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 1200 may communicate with one another using a suitable bus or interconnect (IX) technology, which may include any number of technologies, including ISA, EISA, PCI, PCix, PCie, a Time-Trigger Protocol (TTP) system, a FlexRay system, or any number of other technologies. The bus/IX may be a proprietary bus/IX, for example, used in a SoC based system. Other bus/IX systems may be included, such as an I²C interface, an SPI interface, point-to-point interfaces, and a power bus, among others.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for a User Equipment (UE), the method comprising: receiving a downlink scheduling grant comprising a downlink control information (DCI), the DCI indicating that the UE should apply a change in monitoring behavior; determining a processing time for the change in monitoring behavior; transmitting an Acknowledgement (ACK) message to indicate that the DCI was received; and applying the change in monitoring behavior when an amount of time equivalent to the processing time has elapsed after the ACK message was transmitted.

Example 2 is the method of Example 1, wherein the change in monitoring behavior comprises switching or skipping.

Example 3 is the method of Example 1, further comprising: generating and transmitting a negative-acknowledgment (NACK) message when the UE fails to correctly decode the DCI or when the UE did not decode a physical downlink shared channel (PDSCH); and receiving a retransmission DCI indicating that the UE should apply the skipping or the switching.

Example 4 is the method of Example 1, wherein the processing time depends on whether the change in monitoring behavior is switching or skipping.

Example 5 is the method of Example 4, wherein if the change in monitoring behavior is switching, the processing time includes time to decode the DCI and configure a separate search space.

Example 6 is the method of Example 4, wherein if the change in monitoring behavior is skipping, the processing time includes time to decode the DCI and apply a skipping command.

Example 7 is the method of Example 1, wherein the processing time includes time to decode the DCI and configure separate search space regardless of whether the change in monitoring behavior is switching or skipping.

Example 8 is the method of Example 1, wherein the processing time includes processing time for a network node to process the ACK message.

Example 9 is the method of Example 1, wherein the processing time is equivalent to a drx-HARQ-RTT-TimerDL.

Example 10 is the method of Example 1, wherein determining the processing time comprises: determining time periods corresponding to one or more of: a first time corresponding to decoding the DCI and configuring a separate search space; a second time corresponding to decoding the DCI and applying a skipping command; a third time corresponding to a network node processing the ACK message; a fourth time corresponding to a drx-HARQ-RTT-TimerDL; and identifying a maximum of the time periods, wherein the maximum is the processing time.

Example 11 is a method for a (User Equipment) UE, the method comprising: receiving an uplink scheduling grant comprising a downlink control information (DCI), the DCI indicating that the UE should apply skipping or switching to change monitoring behavior; determining whether Discontinuous Reception Mode (DRX) is configured or not configured; determining a reference point for the skipping or switching based on whether DRX is configured or not configured; determining a processing time for the skipping or switching; and applying the skipping or the switching when an amount of time equivalent to the processing time has elapsed after the reference point.

Example 12 is the method of Example 11, wherein when the DRX is configured, if a drx-RetransmissionTimerUL is less than a threshold, the reference point is after drx-RetransmisionTimerUL expires, and if the drx-RetransmissionTimerUL is larger than the threshold, the reference point is after a Physical Uplink Shared Channel (PUSCH) transmission.

Example 13 is the method of Example 11, wherein the processing time corresponds to one of: a first time corresponding to decoding the DCI and configuring a separate search space; a second time corresponding to decoding the DCI and applying a skipping command; a third time corresponding to a network node processing a PUSCH message; a fourth time corresponding to a drx-HARQ-RTT-TimerUL.

Example 14 is the method of Example 13, wherein the processing time is a maximum of the first time, the second time, the third time, and the fourth time.

Example 15 is the method of Example 11, wherein when DRX is not configured, the reference point is after a PUSCH transmission.

Example 16 is a method for a (User Equipment) UE, the method comprising: receiving a non-scheduling downlink control information (DCI), the non-scheduling DCI indicating that the UE should apply a change monitoring behavior; determining whether the change in monitoring behavior is switching or skipping; determining a processing time for the change in monitoring behavior based on whether the change monitoring behavior is switching or skipping; and applying the change in monitoring behavior when an amount of time equivalent to the processing time has elapsed after the last of symbol of non-scheduling DCI.

Example 17 is the method of Example 16, wherein if the change in monitoring behavior is switching, the processing time includes time to decode the DCI and configure a separate search space.

Example 18 is the method of Example 16, wherein if the change in monitoring behavior is skipping, the processing time includes time to decode the DCI and apply a skipping command.

Example 19 is the method of Example 16, wherein if both skipping and switching are triggered, the processing time includes time to decode the DCI and configure a separate search space.

Example 20 is the method of Example 16, further comprising switching from sparse pattern to dense pattern based on a timer if the UE miss-detects the non-scheduling DCI.

Example 1C may include an apparatus comprising means to perform one or more elements of a method described in or related to any of the above Examples, or any other method or process described herein.

Example 2C may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 3C may include an apparatus comprising logic, modules, or circuitry to perform one or more elements of a method described in or related to any of the above Examples, or any other method or process described herein.

Example 4C may include a method, technique, or process as described in or related to any of the above Examples, or portions or parts thereof.

Example 5C may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 6C may include a signal as described in or related to any of the above Examples, or portions or parts thereof.

Example 7C may include a datagram, packet, frame, segment, protocol data unit (PDU), or message as described in or related to any of the above Examples, or portions or parts thereof, or otherwise described in the present disclosure.

Example 8C may include a signal encoded with data as described in or related to any of the above Examples, or portions or parts thereof, or otherwise described in the present disclosure.

Example 9C may include a signal encoded with a datagram, packet, frame, segment, PDU, or message as described in or related to any of the above Examples, or portions or parts thereof, or otherwise described in the present disclosure.

Example 10C may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 11C may include a computer program comprising instructions, wherein execution of the program by a processing element is to cause the processing element to carry out the method, techniques, or process as described in or related to any of the above Examples, or portions thereof.

Example 12C may include a signal in a wireless network as shown and described herein.

Example 13C may include a method of communicating in a wireless network as shown and described herein.

Example 14C may include a system for providing wireless communication as shown and described herein.

Example 15C may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for a User Equipment (UE), the method comprising:
   receiving a downlink scheduling grant comprising a downlink control information (DCI), the DCI indicating that the UE should apply a change in monitoring behavior;
   determining a processing time for the change in monitoring behavior, wherein determining the processing time comprises:
      determining time periods corresponding to:
         a first time corresponding to decoding the DCI and configuring a separate search space,
         a second time corresponding to decoding the DCI and applying a skipping command,
         a third time corresponding to a network node processing the ACK message, and
         a fourth time corresponding to a drx-HARQ-RTT-TimerDL; and
      identifying a maximum of the time periods, wherein the maximum of the time periods is the processing time;
   transmitting an Acknowledgement (ACK) message to indicate that the DCI was received; and
   applying the change in monitoring behavior when an amount of time equivalent to the processing time has elapsed after the ACK message was transmitted.

2. The method of claim 1, wherein the change in monitoring behavior comprises switching or skipping.

3. The method of claim 1, further comprising:
   generating and transmitting a negative-acknowledgment (NACK) message when the UE fails to correctly decode the DCI or when the UE did not decode a physical downlink shared channel (PDSCH); and
   receiving a retransmission DCI indicating that the UE should apply skipping or switching.

4. The method of claim 1, wherein the processing time depends on whether the change in monitoring behavior is switching or skipping.

5. An apparatus for a User Equipment (UE), comprising:
   a memory to store a downlink scheduling grant; and
   one or more processors configured to cause the UE to:
      receive the downlink scheduling grant comprising a downlink control information (DCI), the DCI indicating that the UE should apply a change in monitoring behavior;

determine a processing time for the change in monitoring behavior, wherein determining the processing time comprises:
  determining time periods corresponding to:
    a first time corresponding to decoding the DCI and configuring a separate search space;
    a second time corresponding to decoding the DCI and applying a skipping command;
    a third time corresponding to a network node processing the ACK message;
    a fourth time corresponding to a drx-HARQ-RTT-TimerDL; and
  identifying a maximum of the time periods, wherein the maximum of the time periods is the processing time;
  transmit an Acknowledgement (ACK) message to indicate that the DCI was received; and
  apply the change in monitoring behavior when an amount of time equivalent to the processing time has elapsed after the ACK message was transmitted.

6. The apparatus of claim 5, wherein the change is monitoring behavior comprises switching or skipping.

7. The apparatus of claim 5, wherein the one or more processors are further configured to cause the UE to:
  generate and transmit a negative-acknowledgment (NACK) message when the UE fails to correctly decode the DCI or when the UE did not decode a physical downlink shared channel (PDSCH); and
  receive a retransmission DCI indicating that the UE should apply skipping or switching.

8. The apparatus of claim 5, wherein the processing time depends on whether the change in monitoring behavior is switching or skipping.

9. A non-transitory computer-readable storage medium including instructions that, when executed by one or more processors of a User Equipment (UE), cause the UE to:
  receive a downlink scheduling grant comprising a downlink control information (DCI), the DCI indicating that the UE should apply a change in monitoring behavior;
  determine a processing time for the change in monitoring behavior, wherein to determine the processing time the instructions cause the UE to:
    determine time periods corresponding to:
      a first time corresponding to decoding the DCI and configuring a separate search space,
      a second time corresponding to decoding the DCI and applying a skipping command,
      a third time corresponding to a network node processing the ACK message, and
      a fourth time corresponding to a drx-HARQ-RTT-TimerDL; and
    identify a maximum of the time periods, wherein the maximum of the time periods is the processing time;
  transmit an Acknowledgement (ACK) message to indicate that the DCI was received; and
  apply the change in monitoring behavior when an amount of time equivalent to the processing time has elapsed after the ACK message was transmitted.

10. The non-transitory computer-readable storage medium of claim 9, wherein the change in monitoring behavior comprises switching or skipping.

11. The non-transitory computer-readable storage medium of claim 9, wherein the instructions, when executed by the one or more processors of the UE, further cause the UE to:
  generate and transmit a negative-acknowledgment (NACK) message when the UE fails to correctly decode the DCI or when the UE did not decode a physical downlink shared channel (PDSCH); and
  receive a retransmission DCI indicating that the UE should apply skipping or switching.

12. The non-transitory computer-readable storage medium of claim 9, wherein the processing time depends on whether the change in monitoring behavior is switching or skipping.

* * * * *